(12) United States Patent
Huang et al.

(10) Patent No.: US 9,176,160 B2
(45) Date of Patent: Nov. 3, 2015

(54) IDENTIFICATION SYSTEM AND ELECTRONIC SYSTEM FOR IDENTIFYING A FAN TYPE OF A FAN

(71) Applicant: International Business Machines Corporation, Armonk, NY (US)

(72) Inventors: Kelvin WP Huang, Zhonghe (TW); Marcus A. Kelly, Bellevue, WA (US); Edward YC Kung, Xindian (TW)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 408 days.

(21) Appl. No.: 13/908,046

(22) Filed: Jun. 3, 2013

(65) Prior Publication Data

US 2014/0028292 A1  Jan. 30, 2014

(30) Foreign Application Priority Data

Jul. 30, 2012  (TW) .............................. 101127414 A

(51) Int. Cl.
*G01P 3/56*  (2006.01)
*G01P 3/489*  (2006.01)
*F04B 51/00*  (2006.01)
*F04D 27/00*  (2006.01)

(52) U.S. Cl.
CPC ................. *G01P 3/489* (2013.01); *F04B 51/00* (2013.01); *F04D 27/001* (2013.01); *F04D 27/004* (2013.01)

(58) Field of Classification Search
CPC ....... F04B 1/00; F04D 27/001; F04D 27/004; G01P 3/489
USPC .................................................. 324/160–166
See application file for complete search history.

(56) References Cited

U.S. PATENT DOCUMENTS

| | | | | |
|---|---|---|---|---|
| 6,737,860 | B2 * | 5/2004 | Hsu .................... | H05K 7/20209 324/161 |
| 2007/0019383 | A1 * | 1/2007 | Chang ................ | H05K 7/20209 361/695 |
| 2010/0097019 | A1 | 4/2010 | Artman et al. | |
| 2012/0084551 | A1 | 4/2012 | Cheng et al. | |

* cited by examiner

*Primary Examiner* — Jay Patidar
(74) *Attorney, Agent, or Firm* — Katherine S. Brown; Jeffrey L. Streets

(57) ABSTRACT

A fan identification system identifies a fan type of a fan in an electronic system. The fan identification system includes a controller that includes: a setting module for setting a fan identification characteristic value corresponding to a pulse width modulation duty cycle with a substantial maximum difference between a fan speed of a first type of fan and a fan speed of a second type of fan; a reading module for reading a stable fan speed value after the fan receives the fan identification characteristic value and is initiated with the fan identification characteristic value; and an identification module for identifying the fan as the first type of fan or the second type of fan based on which fan has a predetermined fan speed that is the closest to the stable fan speed value when operating at the fan identification characteristic value.

8 Claims, 6 Drawing Sheets

| PWM (%) | fan A(RPM) | fan B(RPM) | Difference(RPM) |
|---|---|---|---|
| 100 | 9631 | 9400 | 231 |
| 90 | 8860 | 8600 | 260 |
| 80 | 8069 | 7970 | 99 |
| 70 | 7226 | 7238 | −12 |
| 60 | 6478 | 6542 | −64 |
| 50 | 5680 | 5900 | −220 |
| 40 | 4831 | 5114 | −283 |
| 30 | 4052 | 4400 | −348 |
| 20 | 3241 | 3685 | −444 |
| 10 | 2401 | 2800 | −399 |
| 0 | 1502 | 1800 | −298 |

| PWM (%) | fan A(RPM) | fan B(RPM) | Difference(RPM) |
|---|---|---|---|
| 100 | 9631 | 9400 | 231 |
| 90 | 8860 | 8600 | 260 |
| 80 | 8069 | 7970 | 99 |
| 70 | 7226 | 7238 | −12 |
| 60 | 6478 | 6542 | −64 |
| 50 | 5680 | 5900 | −220 |
| 40 | 4831 | 5114 | −283 |
| 30 | 4052 | 4400 | −348 |
| 20 | 3241 | 3685 | −444 |
| 10 | 2401 | 2800 | −399 |
| 0 | 1502 | 1800 | −298 |

//

IDENTIFICATION SYSTEM AND ELECTRONIC SYSTEM FOR IDENTIFYING A FAN TYPE OF A FAN

CROSS-REFERENCE TO RELATED APPLICATIONS

This application claims the right of priority based on Taiwan Patent Application No. 101127414 entitled "METHOD, IDENTIFICATION SYSTEM, AND ELECTRONIC SYSTEM FOR IDENTIFYING A FAN TYPE OF A FAN", filed on Jul. 30, 2012, which is incorporated herein with reference and assigned to the assignee herein.

BACKGROUND

1. Field of the Invention

The present invention generally relates to an electronic device, and more particularly, to a method and a system for automatically identifying a fan arrangement.

2. Background of the Related Art

To cope with a variety of market demands and cost concerns, manufacturers of electronic devices (for example, but not limited to, computer systems, etc.) typically offer consumers a wide variety of choices for products. However, the manufacturer typically adopts component parts from different suppliers or sources, which can increase the complexity of production, impair quality and efficiency, and increase production costs.

As technologies advance, there may be an increase in power consumption and operating frequency of components (for example, but not limited to, a processor, memory, etc.) in the electronic device. Consequently, heat generated from these components correspondingly increases. In order to prevent malfunction and damage of the components due to overheating, it is necessary to monitor the temperature of components and, more importantly, to dissipate heat from the components so as to maintain the temperature within a reasonable range.

In order to dissipate heat from the computer system, cooling fins, fans, and other heat management devices can be used. Cooling fins can assist in the transfer of heat from a target component to the ambient cold air. On the other hand, there are all kinds of fans, such as 3-wire DC fans, 4-wire pulse width modulation (PWM) controlled fans, etc., which can be used to dissipate heat from the internal components of the computer system.

In general, the computer system may need multiple fans to prevent malfunction and damage and to improve the reliability of the computer system. In particular, for high capacity products or systems, such as servers, the use of multiple fans is a common solution with regard to a heat dissipation requirement, fan characteristic control, optimum performance, and the like.

For a particular product or system, there are lots of solutions based upon the selection and arrangement of conventional fans. Among others, one solution is to select a specific type of fan only from a single supplier. Although this approach may make the production process relatively simple, the cost reduction is relatively small and it may result in potential issues of supply shortage. Another solution is to select different types of fans having vital product data (VPD) from different suppliers.

Typically, the vital product data, which includes information about manufacture and parts, can be stored in the non-volatile memory (NV memory) of the product. The vital product data generally includes a part number, serial number, product model number, product version, maintenance level, and specific information of other device types. The vital product data can also include user-defined information.

FIG. 1 illustrates the arrangement of NV memory 104 of the fan 100 used in the computer system. The conventional fan 100 at least includes a fan body (not shown), a microprocessor (MCU) 102, and a NV memory 104. Preferably, the NV memory 104 can be, but is not limited to, a flash ROM, a non-volatile EEPROM, etc. Now referring to FIG. 1, the NV memory 104 includes a protected area 108 and a flash area 112. Data stored in the protected area 108 includes non-erasable codes, which can be, but are not limited to, the vital product data associated with the fan 100, such as a part number, serial number, product model number, and other information.

For the vital product data of the fan 100, during the power-on self-test (POST), POST will show the vital product data of the motherboard parts and the system components. POST will also track the vital product data of the system components to determine whether each device stores a correct serial number. If a device is altered or removed, the user is warned via event log and warning messages. Although such a solution has greater flexibility in production, the fan 100 with the vital product data is relatively expensive.

That is, in order to satisfy the strict specification of a fan or the requirements of a product specification, when building a specific computer system, if a single type of fan from a sole supplier is adopted, potential issues, such as less flexibility in arrangement and poor response effect, may occur. On the other hand, if different fans from multiple suppliers are selected, the cost of implementation may be correspondingly increased.

BRIEF SUMMARY

Another embodiment of the present invention provides a fan identification system for identifying a fan type of a fan in an electronic system. The fan identification system includes a controller. The controller includes: a setting module for setting a fan identification characteristic value, the fan identification characteristic value corresponding to a PWM (pulse width modulation) duty cycle with a substantial maximum difference between a fan speed of a first type of fan and a fan speed of a second type of fan; a reading module for reading a stable fan speed value of the fan after the fan receives the fan identification characteristic value and is initiated with the fan identification characteristic value; and an identification module for identifying the fan as the first type of fan or the second type of fan based on which fan has a predetermined fan speed (RPM) that is the closest to the stable fan speed value (RPM) when operating at the fan identification characteristic value (PWM).

Yet another embodiment of the present invention provides an electronic system that includes a target device, a fan, and a controller as described above.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
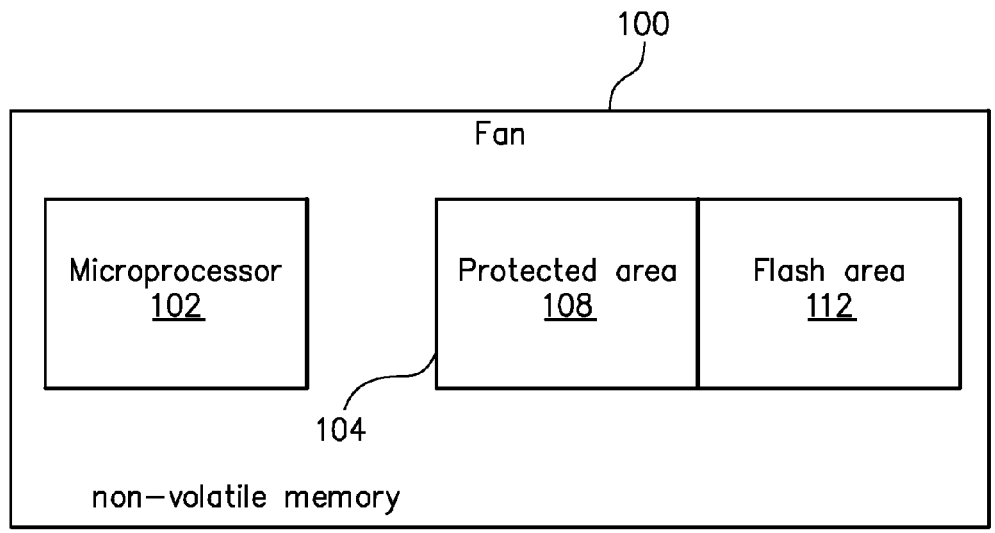
FIG. 1 is a diagram of a fan having non-volatile memory.

Embodiments of the present invention provide a method for identifying a fan type of a fan, an identification system, and an electronic system that provides a system arrangement and assembly with high flexibility at low cost.

One embodiment of the present invention relates to a method for identifying a fan type of a fan in an electronic system having a controller. The method includes: setting a fan identification characteristic value, the fan identification characteristic value corresponding to a PWM (pulse width modulation) duty cycle with a substantial maximum difference in a fan speed (such as measured in revolutions per minute—RPM) of a first type of fan and a fan speed of a second type of fan; receiving, via the fan, the fan identification characteristic value; initiating the fan with the fan identification characteristic value; reading, via the controller, a stable fan speed value of the fan; and identifying, via the controller, the fan type of the fan based on which fan has a predetermined fan speed (RPM) that is the closest to the stable fan speed value (RPM) when operating at the fan identification characteristic value (PWM).

In another embodiment of the present invention, for the first type of fan and the second type of fan, a range of pulse width modulation (PWM) duty cycles are used to obtain a range of fan speeds and further to obtain the substantial difference to set the fan identification characteristic value.

In yet another embodiment of the present invention, the method further includes setting a second fan identification characteristic value, wherein the second fan identification characteristic value corresponds to a time required for the fan to reach the stable fan speed value.

In a further embodiment of the present invention, the method further includes identifying, via the controller, the type of the fan based on the second fan identification characteristic value responsive to the stable fan speed value.

In another embodiment of the present invention, a fan identification system for identifying a fan type of a fan in an electronic system includes a controller. The controller includes: a setting module for setting a fan identification characteristic value, the fan identification characteristic value corresponding to a PWM (pulse width modulation) duty cycle with a substantial maximum difference in a fan speed (as may be measured in revolutions per minute—RPM) of a first type of fan and a fan speed of a second type of fan; a reading module for reading a stable fan speed value of the fan after the fan receives the fan identification characteristic value and is initiated with the fan identification characteristic value; and an identification module for identifying the fan as the first type of fan or the second type of fan based on which fan has a predetermined fan speed (RPM) that is the closest to the stable fan speed value (RPM) when operating at the fan identification characteristic value (PWM).

In a still further embodiment of the present invention, an electronic system includes a target device, a fan, a controller, and a fan identification system as described above.

Figure 2:
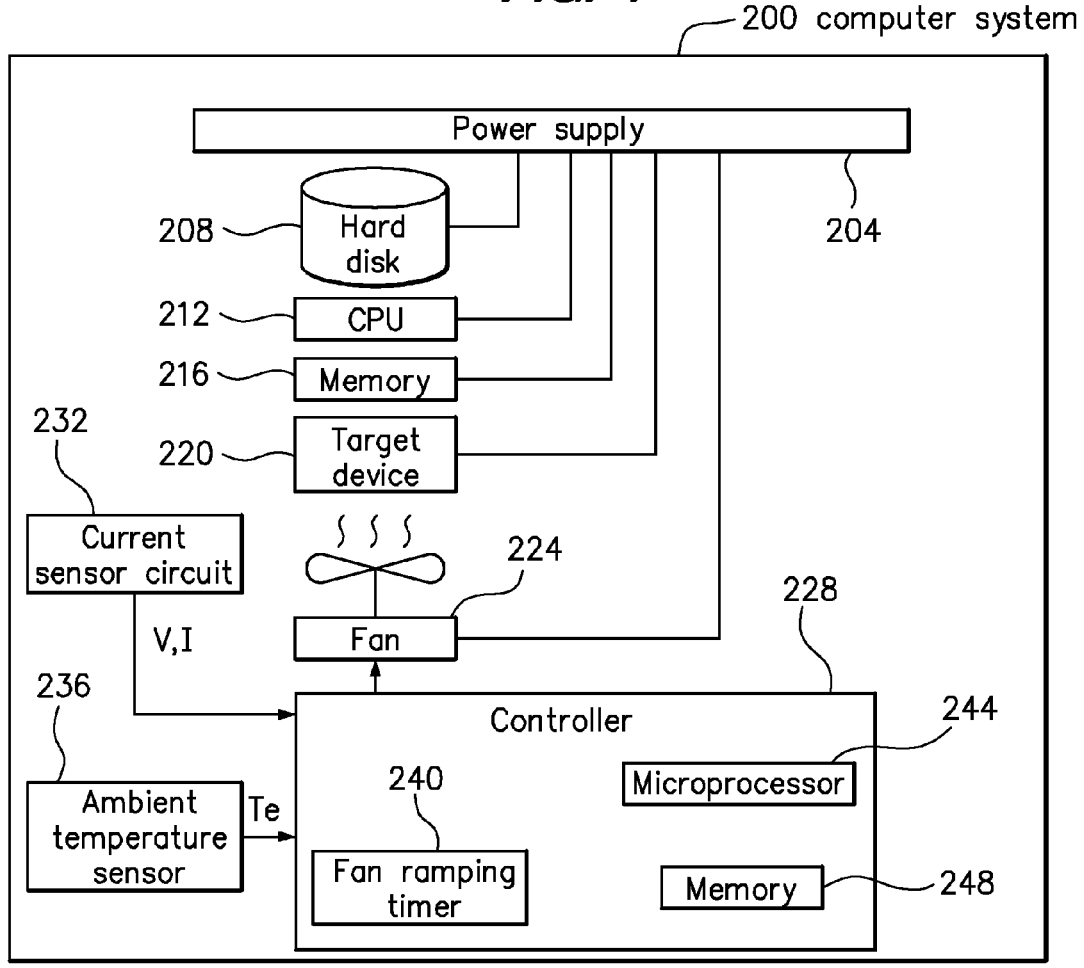
FIG. 2 is a diagram of a computer system 200 having a hardware architecture in accordance an embodiment of the present invention.

FIG. 2 is a diagram of a computer system 200 having a hardware architecture in accordance with an embodiment of the present invention. The computer system 200 includes a power supply 204, a hard disk 208, a CPU 212, a memory 216, a target device 220, a fan 224, a controller 228, a current sensor circuit 232, and an ambient temperature sensor 236. The target device in the specification refers to a device which will generate a large amount of heat during operating, such as, but not limited to, an interface card, a battery, a PCI card, and the like (not show) or the hard disk 208, the CPU 212, and the memory 216 mentioned above. The purpose of the fan 224 is to cool down the target device 220. Other basic architectures and components for computer system 200 may be referred to as an ordinary personal computer or server, such as System X®, Blade Center® or eServer® server from IBM Corp. The details not related to the present invention will be omitted without description.

When the computer system 200 is operating, the power supply 204 is mainly providing DC power to the hard disk 208, the CPU 212, the memory 216, the target device 220, and the fan 224. In the embodiment shown in FIG. 2, only the target device 220 has a fan 224. But, in other embodiments not shown, the hard disk 208, the CPU 212, and the memory 216 may have their individual corresponding fan to enhance the efficiency of heat dissipation. In order to clearly describe the present invention, only the target device 220 and a single fan 224 are used in the description. However, the target device 220 may be, or may be replaced with, the hard disk 208, the CPU 212, the memory 216, or any other device in the computer system that may generate heat and need to be cooled.

Preferably, the fan 224 is a so-called "smart fan", which has a microprocessor 102 as shown in FIG. 1 to drive or manage the operation of the fan 224. For example, the microprocessor of the fan 224 can receive Pulse Width Modulation (PWM) signals and control the speed of the fan 224 according to the duty cycle in PWM signals.

In one non-limiting example, the microprocessor of the fan 224 may be modified based on the microprocessor AVR442 from Atmel Corporation, LB1860 from SANYO Semiconductor Co. Ltd, ZXBM200 from Zetex Semiconductors, etc.

Among others variables, the speed control of the fan 224 is important to effectively cool down components in the system 200. In addition to completely turning the fan ON or OFF, the operation of the fan 224 may be controlled using Pulse Width Modulation, wherein the rotating speed of the fan 224 is controlled by adjusting the duty cycle per unit of time.

Figures 3, 4:
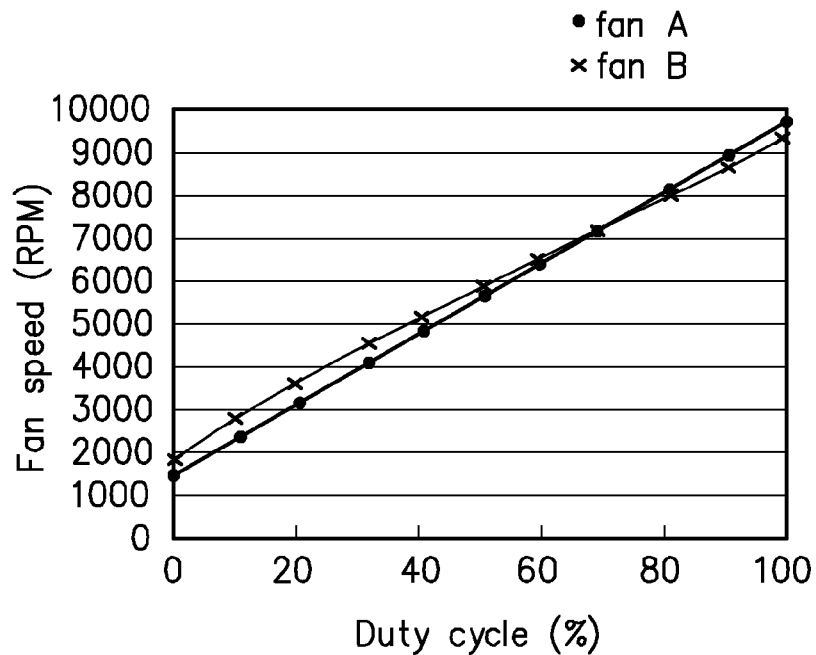
FIG. 3 a graph showing the relationship between the fan speed and the duty cycle of two types of fans from two fan suppliers.
FIG. 4 is a table showing the fan speeds two different fans over a range of input duty cycles (PWM signals).

FIG. 3 is a graph showing the relationship between the fan speed and the duty cycle of two types of fans (e.g. fan A and fan B) from two fan suppliers where either fan may be used when building a specific computer system 200 in accordance with one embodiment of the present invention. When the fan speed is measured by the baseboard management controller or control chip in closed loop, an outputted PWM signal is obtained based on a received RPM signal to enable the control chip to control the fan speed according to the outputted PWM signal, thus obtaining the relationship diagram of FIG. 3.

With respect to FIG. 3, FIG. 4 is a table showing corresponding fan speeds of fan A and fan B under different outputted input PWM signals (0%-100%) in accordance with a preferred embodiment of the present invention. FIG. 4 also illustrates the difference between the fan speed of fan A and the fan speed of fan B (RPM) over a range of duty cycles (PWM). As shown in FIG. 4, when the duty cycle is 20%, the difference between the fan speeds of fan A and fan B has a maximum absolute value (444 RPM).

Figure 5:
FIG. 5 is a graph showing the difference between the fan speeds of two different fans over a range of input duty cycles (PWM signals).

With respect to FIG. 4, FIG. 5 is a graph showing the difference between the fan speeds of fan A and fan B over a range of outputted input PWM signals (0%-100%) in accordance with a preferred embodiment of the present invention. Similarly, as shown in FIG. 4, when the duty cycle is 20%, the difference in the corresponding fan speeds of fan A and fan B has a maximum absolute value. That is, a duty cycle of 20% is the most suitable duty cycle for identifying the fan 224 of the computer system 200 as fan A or fan B (i.e., distinguishing between the fan speed of fan A and the fan speed of fan B at the same 20% duty cycle).

Therefore, in a preferred embodiment of the present invention, the duty cycle which results in a substantial maximum difference of fan speed can be defined as the fan identification characteristic value, which is used to identify the fan 224 of the computer system 200 from a table of available fans.

Figure 6:
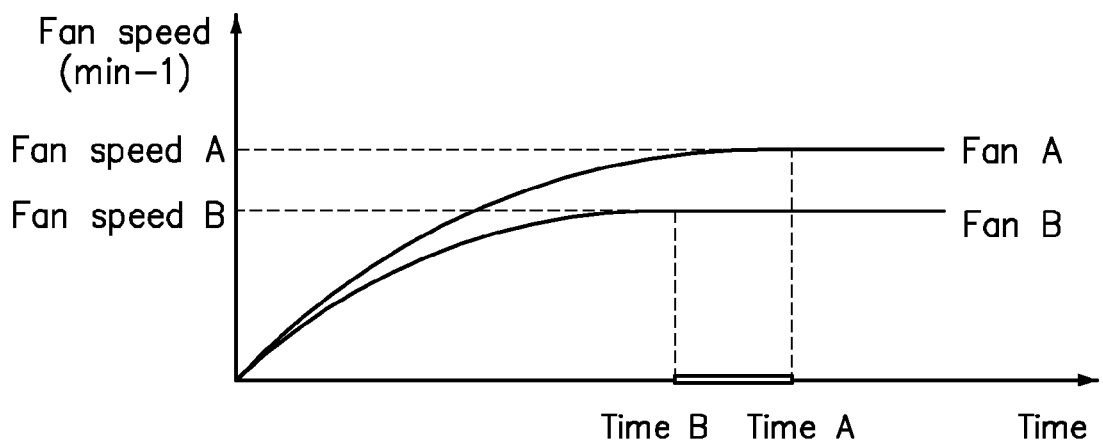
FIG. 6 is a graph showing the time required for the fan speed of two types of fans from two suppliers to reach a stable value.

FIG. 6 is a graph showing the time required for the fan speed of two types of candidate fans (fan A and fan B) from two suppliers to reach a stable fan speed value. This data may be useful when building a specific computer system 200 in accordance with a preferred embodiment of the present invention. When the fan 224 starts to operate, the controller 228 initiates the fan ramping timer 240. After the fan 224 operates for a period of time, the fan speed of the fan 224 will approach a stable value. Once the fan speed of fan 224 reaches the stable value, the controller 228 stops the fan ramping timer 240 and obtains the time required for the fan 224 to reach the stable value. Similarly, data on the time required for different fans to reach the stable value can be also stored in the controller 228 to serve as another fan identification characteristic value for identifying the fan 224 as either fan A or fan B. In other words, in addition to the fan identification characteristic value defined by the PWM (pulse width modulation) duty cycle that is associated with a substantial maximum difference of fan speed, the time required for the fan to reach the stable value can also be determined as a second fan identification characteristic value. The first and second fan identification characteristic values can be used independently or in combination, or may be combined with other fan identification characteristic values to enhance the identification. The present invention is not limited to the illustrated embodiments.

Referring back to FIG. 2, the current sensor circuit 232 provides a tiny resistance, such as 0.001 Ohm, for measuring the current I of the fan 224. Furthermore, the controller 228 may employ the measured current I to determine the duty cycle in PWM signals outputted to the fan 224. The target device 220 may be the hard disk 208, the CPU 212, the memory 216, or any other device in the computer system which will generate heat and need to be cooled.

The ambient temperature sensor 236 is configured for detecting the temperature Te in the operating environment, i.e. room temperature. The ambient temperature sensor 236 may employ a conventional digital thermal sensor, and directly generate a digital signal corresponding to the detected ambient temperature.

The controller 228 comprises a microprocessor 244 and memory 248, preferably integrated in a BMC (Baseboard Management Controller) on a motherboard (not shown) of the computer system 200, such as a VSC 452 BMC provided by Maxim Corp. or SE-SM4210-P01 BMC provided by ServerEngines Corp. It should be noted that the controller 228 may also be implemented as an independent controller. The controller 228 could have a fan ramping timer 240 to record the time that the fan needs to reach a specific steady state speed, as a parameter to distinguish characteristics among different fans.

In an embodiment, the controller 228 may have an A/D port (not shown), which can receive the measured current I detected by the current sensor circuit 232.

The controller 228 may also have another A/D port (not shown), which can receive the ambient temperature Te detected by the ambient temperature sensor 236. Furthermore, the controller 228 may also has a control signal output port for outputting a control signal to the fan 224, and further setting or controlling the fan 224, for example, but not limited to, controlling the activation, stop or rotating speed of the fan 224. For example, the controller 228 can output a PWM signal with different duty cycles to the microprocessor of the fan 224 as a speed control signal, in order to control the speed of the fan 224.

In addition, the controller 228 can output a control signal according to a first fan identification characteristic value obtained in accordance with the discussion of FIGS. 2 to 5 and a second fan identification characteristic value obtained in accordance with the discussion of FIG. 6, by which the computer system 200 can identify the fan as fan A or fan B.

Moreover, when the fan 224 is a PWM fan, the controller 228 can output a PWM signal with different duty cycles to control the fan 224. Furthermore, the memory 248 of the controller 228 may store the firmware required for controlling the fan, and other associated parameters, such as the Specific Heat Capacity/Density of air, sectional area of the target device 220 facing airflow from the fan, a threshold operating temperature Tm (Case Temperature) of the target device 220, or other parameters of the target device 220.

The method for fan identification and control is illustrated with reference to the hardware architecture of FIG. 2, the data of FIGS. 3 to 6, the flowcharts of FIGS. 7, 8 and 9, and the block diagram of FIG. 10.

Figure 7:
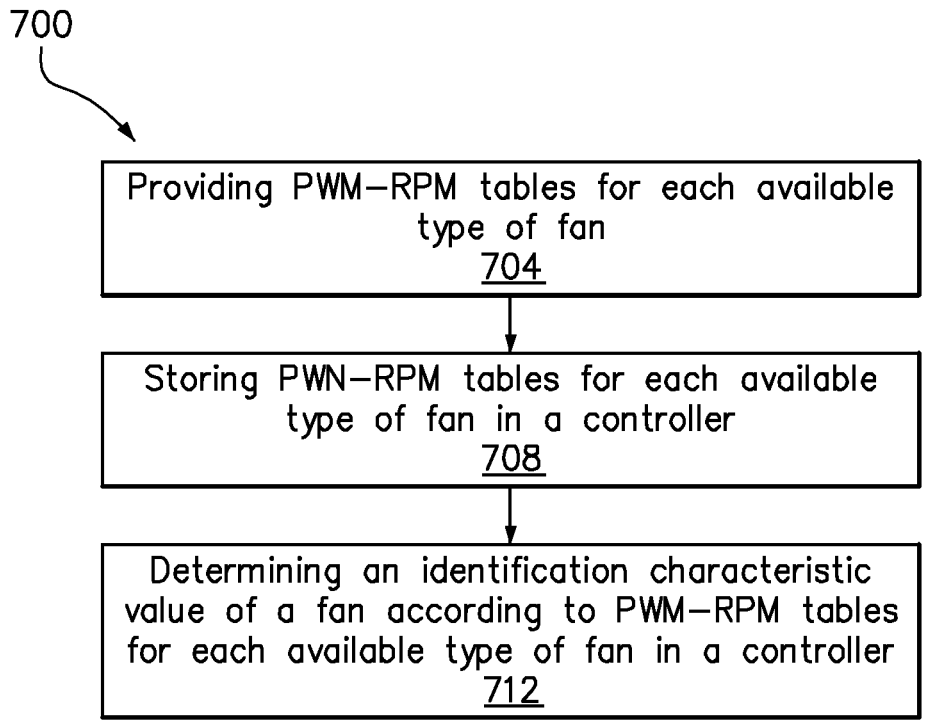
FIG. 7 is a flowchart of a method for determining a first fan identification characteristic value.

FIG. 7 is a flowchart of a method 700 for determining a fan identification characteristic value during POST in accordance with a preferred embodiment of the present invention. The method includes:

Step 704: with respect to the computer system 200, providing PWM to RPM tables (For example, see FIG. 4) for each available type of fan, wherein the available fans include at least two types of fans.

Step 708: storing PWM to RPM tables for each available type of fan in the memory 248 of the controller 228.

Step 712: with respect to the computer system 200, determining, by the controller 228, a fan identification characteristic value of a fan according to the PWM to RPM tables for each available type of fan. In a preferred embodiment of the present invention, the fan identification characteristic value is defined as the PWM duty cycle with a substantial maximum difference of fan speed (RPM) as explained in reference to FIGS. 3 to 5.

Figure 8:
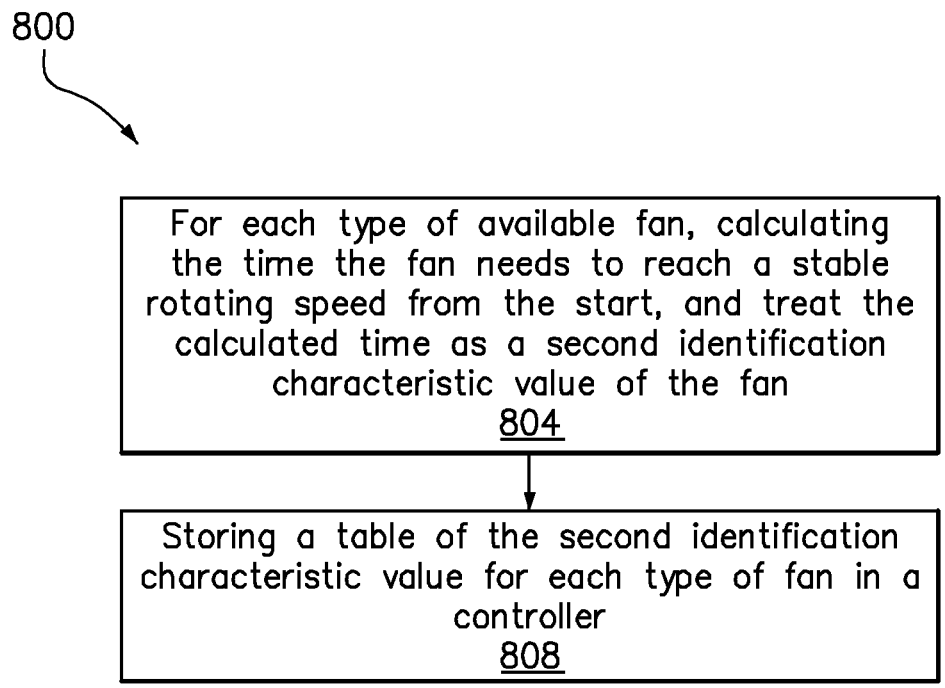
FIG. 8 is a flowchart of a method for determining a second fan identification characteristic value.

FIG. 8 is a flowchart of a method 800 for determining a second fan identification characteristic value with respect to the computer system 200 in accordance with a preferred embodiment of the present invention. The method includes:

Step 804: with respect to the computer system 200, for each type of available fan, calculating the time required for the fan 224 to reach a stable rotating speed from the start, and defining the calculated time as a second identification characteristic value of fan, wherein the available fans include at least two types of fans.

Step 808: storing a table of the time required for the fan to reach the stable rotating speed from the start (i.e. the second identification characteristic value) for each type of fan for which data is stored in the memory 248 of the controller 228.

Figure 9:
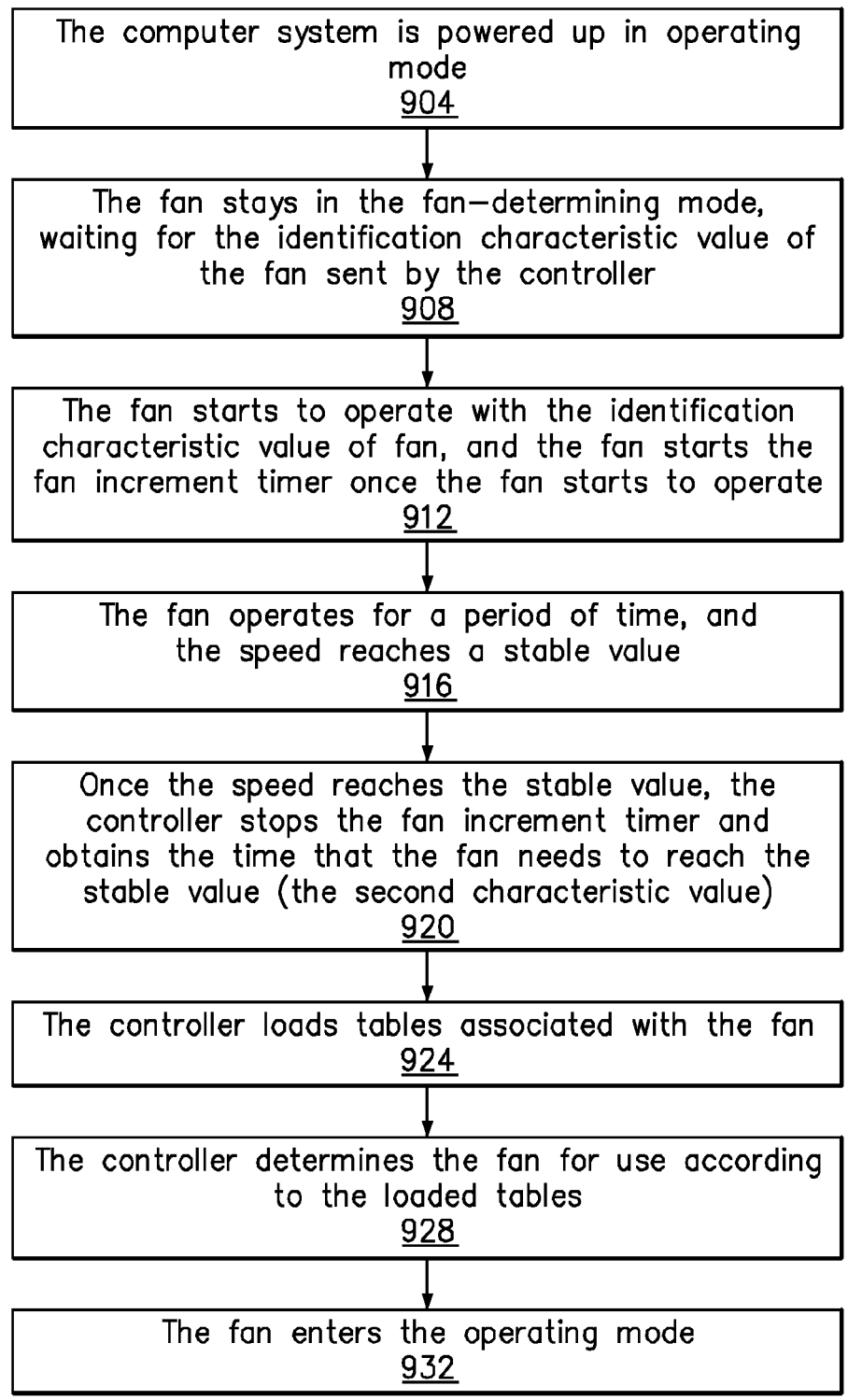
FIG. 9 is a flowchart of a method for identifying the type of fan of the computer system.

FIG. 9 is a flowchart of a method 900 for identifying the type of fan of the computer system 200 in accordance with a preferred embodiment of the present invention. The method includes:

Step 904: powering up the computer system 200.

Step 908: enabling the fan 224 to stay in a "fan-determining mode", and waiting for the fan identification characteristic value sent from the controller 228. The controller 228 can determine the first fan identification characteristic value according to a predetermined rule or using a look-up table. For example, the controller 228 can determine the fan identification characteristic value from the method 700 of FIG. 7, but is not limited thereto. As shown in FIG. 4, a fan may be most easily identified when the duty cycle is 20%, since this is the duty cycle at which a substantial maximum difference of fan speed between fan A and fan B is present (444 RPM).

Step 912: the fan 224 starts to operate with the fan identification characteristic value. Once the fan 224 starts to operate, the controller 228 starts the fan ramping timer 240.

Step 916: after the fan 224 operates for a period of time, the rotating speed of fan 224 approaches a stable value.

Step 920: once the speed of the fan 224 reaches the stable value, the controller 228 stops the fan ramping timer 240 and obtains the time required for the fan 224 to reach the stable value (the second identification characteristic value).

Step 924: the controller 228 loads, from the memory 248, tables associated with each fan as generated according to FIG. 7 and FIG. 8.

Step 928: the controller 228 identifies the fan 224 that is in use to be fan A or fan B according to the loaded tables.

Step 932: after the fan is identified, the fan 224 enters the operating mode and waits for a subsequent speed control signal sent from the controller 228, by which the fan 224 operates at the corresponding speed. Preferably, the rotating speed control signal is a PWM signal, wherein the rotating speed of the fan 224 is controlled by means of the duty cycle in the PWM signal.

Figure 10:
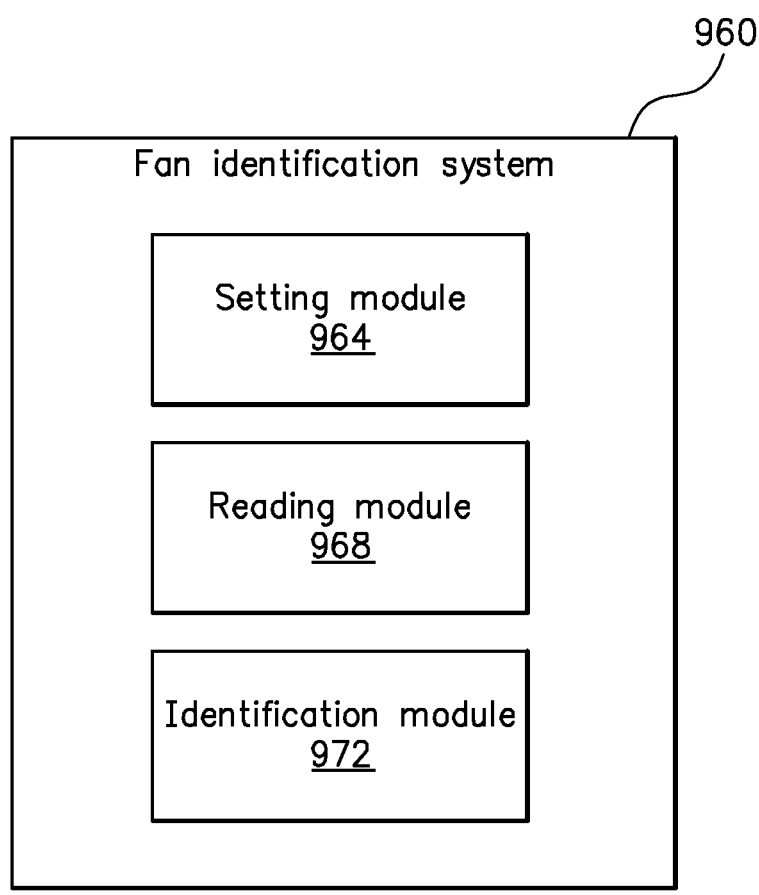
FIG. 10 is a block diagram of a fan identification system for identifying the fan type of a fan.

FIG. 10 illustrates a block diagram of a fan identification system 960 for identifying the type of a fan of an electronic device in accordance with a preferred embodiment of the present invention. The fan identification system 960 includes a setting module 964, a reading module 968, and an identification module 972. The term "module" used in the present invention refers to a section of code or computer program for achieving a specific function, which is more suitable than programs to describe the execution of software in the computer system. Therefore, descriptions of software are generally described as descriptions of modules. Referring to FIGS. 1 to 9, the setting module 964 is configured for setting a fan identification characteristic value, wherein the fan identification characteristic value corresponds to a PWM duty cycle with a substantial maximum difference of a fan speed of a first type of fan and a fan speed of a second type of fan. The reading module 968 is configured for reading a stable RPM value of the fan after the fan receives the fan identification characteristic value and operates with the fan identification characteristic value. The identification module 972 is adapted to, in response to the stable fan speed value, identify the fan as the first type of fan or the second type of fan based on which fan has a predetermined fan speed that is the closest to the stable fan speed value when operating at the fan identification characteristic value.

The device and the method of the present invention can automatically detect and identify the type of fan for different applications or system arrangements. Such a device can be integrated into, for example, the computer system to identify different types of fans that may be used therein.

It is noted that although the embodiments of FIGS. 1 to 10 are illustrated with the identification of two different fans, fan A and fan B, one skilled in the relevant art will recognize that more than two different fans can be identified by means of conventional statistical analysis, such as, without limitation the least square method and the linear regression method. On the other hand, although the controller 228 in FIG. 2 is illustrated as a baseboard management controller, one skilled in the relevant art will recognize that other embodiments are also possible, such as, without limitation, the basic input/output system (BIOS) or an integrated management module (IMM).

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Reference throughout this specification to "one embodiment," "embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A fan identification system for identifying a fan type of a fan in an electronic system, comprising:
   a controller, the controller comprising:
      a setting module for setting a first fan identification characteristic value, the first fan identification characteristic value corresponding to a PWM (pulse width modulation) duty cycle with a substantial maximum difference between a fan speed of a first type of fan and a fan speed of a second type of fan;
      a reading module for reading a stable fan speed value of the fan after the fan receives the first fan identification characteristic value and is initiated with the fan identification characteristic value; and
      an identification module for identifying the fan as the first type of fan or the second type of fan based on which fan has a predetermined fan speed that is the closest to the stable fan speed value when operating at the fan identification characteristic value.

2. The fan identification system of claim 1, wherein, for the first type of fan and the second type of fan, different PWM duty cycles are used to obtain different fan speeds and further to obtain the substantial difference to set the first fan identification characteristic value.

3. The fan identification system of claim 1, wherein the setting module sets a second fan identification characteristic value, and the second fan identification characteristic value corresponds to a time required for the fan in use to reach the stable fan speed value, and wherein, in response to the stable fan speed value, the identification module identifies the fan as the first type of fan or the second type of fan based on the second fan identification characteristic value.

4. The fan identification system of claim 1, wherein the controller is a baseboard management controller or a basic input/output system (BIOS).

5. An electronic system, comprising:
   a target device;
   a fan; and
   a controller, the controller comprising:
      a setting module for setting a first fan identification characteristic value, the first fan identification characteristic value corresponding to a PWM (pulse width modulation) duty cycle with a substantial maximum difference between a fan speed of a first type of fan and a fan speed of a second type of fan;
      a reading module for reading a stable fan speed value of the fan after the fan receives the first fan identification characteristic value and is initiated with the fan identification characteristic value; and
      an identification module for identifying the fan as the first type of fan or the second type of fan based on which fan has a predetermined fan speed that is the closest to the stable fan speed value when operating at the fan identification characteristic value.

6. The electronic system of claim 5, wherein, for the first type of fan and the second type of fan, different PWM duty cycles are used to obtain different fan speeds and further to obtain the substantial difference to set the first fan identification characteristic value.

7. The electronic system of claim 5, wherein the setting module sets a second fan identification characteristic value, and the second fan identification characteristic value corresponds to a time required for the fan in use to reach the stable fan speed value, and wherein, in response to the stable fan speed value, the identification module identifies the fan as the first type of fan or the second type of fan based on the second fan identification characteristic value.

8. The electronic system of claim 5, wherein the controller is a baseboard management controller or a basic input/output system (BIOS).

* * * * *